US008043383B2

(12) United States Patent
Tutin et al.

(10) Patent No.: US 8,043,383 B2
(45) Date of Patent: Oct. 25, 2011

(54) REDUCING FORMALDEHYDE EMISSIONS

(75) Inventors: Kim K. Tutin, East Point, GA (US);
Kurt Gabrielson, Lilburn, GA (US);
Richard Rediger, Conyers, GA (US)

(73) Assignee: Georgia-Pacific Chemicals LLC,
Atlanta, GA (US)

( * ) Notice: Subject to any disclaimer, the term of this patent is extended or adjusted under 35 U.S.C. 154(b) by 170 days.

(21) Appl. No.: 12/136,976

(22) Filed: Jun. 11, 2008

(65) Prior Publication Data

US 2008/0286472 A1    Nov. 20, 2008

Related U.S. Application Data

(63) Continuation-in-part of application No. 11/767,709, filed on Jun. 25, 2007, now abandoned, which is a continuation-in-part of application No. 11/688,892, filed on Mar. 21, 2007, now abandoned, and a continuation-in-part of application No. 11/466,535, filed on Aug. 23, 2006, now abandoned, which is a continuation-in-part of application No. 11/478,980, filed on Jun. 30, 2006.

(60) Provisional application No. 60/946,812, filed on Jun. 28, 2007.

(51) Int. Cl.
*B01D 53/04* (2006.01)
*B01D 53/18* (2006.01)

(52) U.S. Cl. ............... 8/115.51; 427/248.1; 427/255.23; 427/255.27; 55/361

(58) Field of Classification Search .................... 55/522, 55/524, 361; 427/FOR. 102, 248.1, 255.23, 427/255.27; 8/115.51
See application file for complete search history.

(56) References Cited

U.S. PATENT DOCUMENTS

| | | |
|---|---|---|
| 2,870,041 A | 1/1959 | Waddle et al. |
| 3,108,990 A | 10/1963 | Baxter |
| 3,912,836 A | 10/1975 | Johansson |
| 3,957,431 A | 5/1976 | Pai et al. |
| 3,983,094 A | 9/1976 | O'Shea |
| 4,101,489 A | 7/1978 | Reitz et al. |
| 4,101,498 A | 7/1978 | Snyder |
| 4,108,598 A | 8/1978 | Payet |
| 4,127,382 A | 11/1978 | Perry |
| 4,176,105 A | 11/1979 | Miedaner |
| 4,255,102 A | 3/1981 | Smedberg et al. |
| RE030,860 E | 2/1982 | Swidler et al. |
| 4,331,438 A | 5/1982 | Pai |
| 4,342,610 A | 8/1982 | Ray, Jr. |
| 4,346,181 A | 8/1982 | Allan |
| 4,374,814 A | 2/1983 | Gaylord |
| 4,376,807 A * | 3/1983 | Cannon et al. ............... 428/528 |
| 4,396,390 A | 8/1983 | Hendrix et al. |
| 4,397,756 A | 8/1983 | Lehmann |
| 4,409,375 A | 10/1983 | Hartman et al. |
| 4,443,354 A | 4/1984 | Eian |
| 4,458,049 A | 7/1984 | Diem et al. |
| 4,472,165 A | 9/1984 | Gregorian et al. |
| 4,501,628 A | 2/1985 | McGuire et al. |
| 4,517,111 A | 5/1985 | Dorman et al. |
| 4,547,350 A | 10/1985 | Gesser |
| 4,678,686 A * | 7/1987 | Park .............................. 427/254 |
| 4,753,746 A | 6/1988 | Mesmer et al. |
| 4,757,108 A | 7/1988 | Walisser |
| 4,892,719 A | 1/1990 | Gesser |
| 5,108,798 A | 4/1992 | Guerro et al. |
| 5,112,652 A | 5/1992 | Greene |
| 5,160,679 A | 11/1992 | Greene |
| 5,206,204 A | 4/1993 | Tsutsumi et al. |
| 5,215,768 A | 6/1993 | Vinci et al. |
| 5,231,063 A | 7/1993 | Fukumoto et al. |
| 5,286,363 A | 2/1994 | Anderson et al. |
| 5,296,584 A | 3/1994 | Walisser |
| 5,318,802 A * | 6/1994 | Ishikawa et al. .............. 427/254 |
| 5,318,990 A | 6/1994 | Strauss |
| 5,340,868 A | 8/1994 | Strauss et al. |
| 5,358,748 A | 10/1994 | Mathews |
| 5,362,784 A | 11/1994 | Brodie, III et al. |
| 5,395,494 A | 3/1995 | Anderson et al. |
| 5,409,769 A | 4/1995 | Fukumoto et al. |
| 5,413,827 A | 5/1995 | Brodie, III et al. |
| 5,530,048 A | 6/1996 | McDonald et al. |
| 5,538,761 A | 7/1996 | Taylor |
| 5,578,371 A | 11/1996 | Taylor et al. |
| 5,603,927 A | 2/1997 | Fukumoto et al. |
| 5,612,405 A | 3/1997 | Bainbridge |
| 5,670,585 A | 9/1997 | Taylor |

(Continued)

FOREIGN PATENT DOCUMENTS

DE         2847975         5/1980

(Continued)

OTHER PUBLICATIONS

Southern Ionics, Inc. Sulfur Products Handbook (Brochure) Copyright 2004.
George Myers. Effects of Post-Manufacture Board Treatments on Formaldehyde Emission: A Literature Review (1960-1984). Forest Products Journal-1986, vol. 36, No. 6, pp. 41-51.
I. Anderson, G.R. Lundqvist and L. Molhave. The Effect of Air Humidity and Sulphur Dioxide on Formaldehyde Emission from a Construction Material (Chipboard). Holzforschung und Holzverwertung 28 (1976) 5, pp. 120-121.

(Continued)

*Primary Examiner* — Amina Khan
(74) *Attorney, Agent, or Firm* — Michael S. Kerns (57) ABSTRACT

A method for reducing formaldehyde emissions from articles prepared from, or which otherwise comprise formaldehyde-emitting compositions, such as formaldehyde-containing resins, is described. The method relates especially to a method for reducing formaldehyde emissions from products such as cellulose laminates, permanent press (wrinkle-free) textiles, floral foams and ceiling or acoustical tiles, which involves isolating the article in an enclosed space with a formaldehyde scavenger, particularly a formaldehyde scavenger carried by a substrate.

19 Claims, 3 Drawing Sheets

U.S. PATENT DOCUMENTS

| | | | |
|---|---|---|---|
| 5,674,971 A | 10/1997 | Graves | |
| 5,684,118 A | 11/1997 | Breyer et al. | |
| 5,693,684 A | 12/1997 | Rader | |
| 5,698,108 A | 12/1997 | Okun | |
| 5,705,537 A | 1/1998 | Hartman, Jr. et al. | |
| 5,710,239 A | 1/1998 | Tutin | |
| 5,717,031 A | 2/1998 | Degen | |
| 5,719,228 A | 2/1998 | Taylor | |
| 5,846,603 A | 12/1998 | Miller | |
| 5,885,303 A | 3/1999 | Payet | |
| 5,942,323 A | 8/1999 | England | |
| 5,952,440 A | 9/1999 | Walisser | |
| 6,004,522 A | 12/1999 | England | |
| 6,024,775 A * | 2/2000 | Miller et al. | 55/385.1 |
| 6,132,870 A | 10/2000 | Halladay | |
| 6,136,058 A | 10/2000 | Miller | |
| 6,194,512 B1 | 2/2001 | Chen | |
| 6,203,577 B1 | 3/2001 | Yanai et al. | |
| 6,245,438 B1 | 6/2001 | Dupre et al. | |
| 6,316,521 B1 | 11/2001 | Disch et al. | |
| 6,395,819 B1 | 5/2002 | Espiard | |
| 6,441,122 B1 | 8/2002 | DeMott et al. | |
| 6,472,469 B2 | 10/2002 | Bristol et al. | |
| 6,540,936 B1 | 4/2003 | Takagi et al. | |
| 6,555,616 B1 | 4/2003 | Helbing et al. | |
| 6,593,420 B1 | 7/2003 | Helbing et al. | |
| 6,608,162 B1 | 8/2003 | Chiu | |
| 6,638,882 B1 | 10/2003 | Helbing et al. | |
| 6,646,094 B1 | 11/2003 | Malhotra | |
| 6,706,808 B2 | 3/2004 | Delaviz et al. | |
| 6,706,809 B2 | 3/2004 | Tutin | |
| 6,723,570 B2 | 4/2004 | Qin et al. | |
| 6,749,949 B2 | 6/2004 | Ljungar et al. | |
| 6,821,636 B2 | 11/2004 | Ljungar et al. | |
| 6,827,746 B2 | 12/2004 | Payet | |
| 6,861,099 B2 | 3/2005 | Gabrielson et al. | |
| 6,881,814 B2 | 4/2005 | Tang | |
| 6,893,579 B2 | 5/2005 | Espiard | |
| 6,906,132 B2 | 6/2005 | Belmares et al. | |
| 6,911,189 B1 | 6/2005 | Koller et al. | |
| 6,933,349 B2 | 8/2005 | Chen | |
| 2001/0009945 A1 | 7/2001 | Delaviz et al. | |
| 2003/0041735 A1 | 3/2003 | Yoshikawa | |
| 2003/0099850 A1 | 5/2003 | Belmares et al. | |
| 2003/0224119 A1 | 12/2003 | Coventry-Saylor | |
| 2003/0224120 A1 | 12/2003 | Coventry-Saylor | |
| 2004/0028876 A1 | 2/2004 | Mizuno | |
| 2004/0048531 A1 | 3/2004 | Belmares et al. | |
| 2004/0131874 A1 | 7/2004 | Tutin | |
| 2004/0250683 A1 | 12/2004 | Soane et al. | |
| 2005/0161054 A1 | 7/2005 | Sasaki et al. | |
| 2005/0236606 A1 | 10/2005 | Toas et al. | |
| 2005/0279116 A1 | 12/2005 | Park et al. | |
| 2006/0053824 A1 | 3/2006 | Jung | |
| 2006/0057923 A1 | 3/2006 | Jaffee | |
| 2006/0130451 A1 | 6/2006 | Ding et al. | |
| 2006/0141121 A1 | 6/2006 | Yoshikawa | |
| 2006/0222877 A1 | 10/2006 | Khabbaz | |
| 2007/0173155 A1 | 7/2007 | Shoemake et al. | |
| 2007/0287018 A1 | 12/2007 | Tutin et al. | |
| 2008/0003346 A1 | 1/2008 | Boyer et al. | |
| 2008/0003902 A1 | 1/2008 | Boyer et al. | |
| 2008/0038971 A1 | 2/2008 | Tutin et al. | |
| 2008/0118568 A1 * | 5/2008 | Smets et al. | 424/489 |
| 2008/0138526 A1 | 6/2008 | Tutin et al. | |
| 2008/0233333 A1 | 9/2008 | Tutin et al. | |
| 2008/0233334 A1 | 9/2008 | Tutin et al. | |
| 2009/0004391 A1 | 1/2009 | Olang et al. | |

FOREIGN PATENT DOCUMENTS

| | | |
|---|---|---|
| DE | 4112296 A1 | 10/1991 |
| JP | 52-124999 A | 10/1977 |
| JP | 53-009709 | 1/1978 |
| JP | 59147069 A | 8/1984 |
| JP | 61-285973 | 12/1986 |
| JP | 10058588 A | 3/1998 |
| JP | 10138205 A2 | 5/1998 |
| JP | 10195209 A | 7/1998 |
| JP | 10296918 * | 11/1998 |
| JP | 11-042741 A | 2/1999 |
| JP | 11-114041 | 4/1999 |
| JP | 11-165379 A | 6/1999 |
| JP | 11223023 A | 8/1999 |
| JP | 11333813 A2 | 12/1999 |
| JP | 2000-301667 A | 10/2000 |
| JP | 2000301667 * | 10/2000 |
| JP | 2001-178805 A | 7/2001 |
| JP | 2002-273145 A | 9/2002 |
| JP | 2003001747 * | 1/2003 |
| JP | 2004181045 * | 6/2004 |
| JP | 2005125587 A | 5/2005 |
| JP | 2005194634 A | 7/2005 |
| JP | 2007021929 A2 | 2/2007 |
| WO | 0194436 A2 | 12/2001 |
| WO | 02/072324 A1 | 9/2002 |
| WO | 02072323 A1 | 9/2002 |
| WO | 2004039545 A1 | 5/2004 |
| WO | 2006104455 A1 | 10/2006 |
| WO | 2007/082837 A1 | 7/2007 |

OTHER PUBLICATIONS

N. Minemura, S. Imura, S. Hirata and H. Takahashi. Research on the Deodorization of Urea Resin-Bonded Plywood. Hokkaido Forest Products Research Institute. Research Report #65, Jun. 1976, pp. 53-87. Translation pagination: pp. 1-57.

ASTM Designation: C 665-91. Standard Specification for Mineral-Fiber Blanket Thermal Insulation for Light Frame Construction and Manufactured Housing. Published Nov. 1991. pp. 251-255.

J. Frederick Walker. Formaldehyde. 3rd Edition. pp. 250-253, 486-487 and 620-623.

PCT International Search Report, PCT/US2007/069941, Jul. 30, 2008, European Patent Office.

PCT International Search Report, PCT/US2007/071987, Jul. 30, 2008, European Patent Office.

PCT International Search Report and Written Opinion for PCT/US2008/066505, mailed Sep. 23, 2008, 8 pages, European Patent Office, Rijswijk, Netherlands.

European Patent Office, PCT International Search Report and Written Opinion for PCT/US07/69923 mailed Jun. 10, 2008, seven pages, Rijswijk, Netherlands (20172-P1-PCT).

European Patent Office, Written Opinion for PCT/US2007/069941 mailed Jul. 30, 2008, seven pages, Rijswijk, Netherlands (20196-P1-PCT).

European Patent Office, Written Opinion for PCT/US2007/071987 mailed Jul. 30, 2008, seven pages, Rijswijk, Netherlands (20310-PCT).

* cited by examiner

REDUCING FORMALDEHYDE EMISSIONS

CROSS-REFERENCE TO RELATED APPLICATION

This application claims the benefit of priority of U.S. Provisional Application No. 60/946,812 filed Jun. 28, 2007 which is hereby incorporated by reference in its entirety. This application is also a continuation-in-part of U.S. application Ser. No. 11/767,709 filed Jun. 25, 2007, now abandoned which is a continuation-in-part of U.S. application Ser. No. 11/688,892 filed Mar. 21, 2007 now abandoned each of which is hereby incorporated by reference in its entirety. This application is also a continuation-in-part of U.S. application Ser. No. 11/466,535 filed Aug. 23, 2006, now abandoned which is a continuation-in-part of U.S. application Ser. No. 11/478,980 filed Jun. 30, 2006 each of which is hereby incorporated by reference in its entirety.

FIELD OF THE INVENTION

The present invention relates to methods for reducing formaldehyde emissions from products and articles prepared using a formaldehyde-emitting composition, or which otherwise comprise a formaldehyde-emitting composition, such as a formaldehyde-containing resin, and relates especially to a method for reducing formaldehyde emissions from products and articles such as cellulose laminates, permanent press (wrinkle-free) textiles, floral foams and ceiling tiles.

BACKGROUND OF THE INVENTION

Formaldehyde-based resins or formaldehyde-containing resins, such as urea-formaldehyde (UF) resins, phenol-formaldehyde (PF) resins, including PF resins extended with urea (PFU), melamine-formaldehyde (MF) resins, melamine-formaldehyde resins modified with urea (MUF) and the like, find widespread use as adhesives, bonding agents and strengthening agents for making a wide variety of products.

For example, PF and PUF resins in particular have been the mainstays of fiberglass insulation binder technology over the past several years. Such resins are inexpensive and provide cured fiberglass insulation products with excellent physical properties.

Such formaldehyde-base resins, particularly, MF, MUF and UF resins, have been used as binders in acoustical tiles, e.g., ceiling tiles, and PF and MF resins have been used to impregnate or saturate thin fibrous, usually cellulosic, e.g., paper, sheets which are assembled in layers and cured to form protective, decorative laminates.

Formaldehyde itself, or compositions based on formaldehyde or which emit formaldehyde also have long been used to provide permanent press, or wrinkle free characteristics to textiles. Representative of this technology are U.S. Pat. Nos. 6,827,746; 5,885,303; 4,396,390 and 4,108,598.

Rigid but friable foams made from PF and UF resins also are widely used to provide water to cut flowers. These commercially available floral foams usually are formulated as an open-celled, cured PF resin, and have the capability of retaining a significant amount of moisture.

The ability of these formaldehyde-based compositions to provide the necessary performance benefits at a reduced cost relative to other technologies has thus made such formaldehyde-based compositions, including UF, PF, MF, MUF and PUF resins, popular in connection with the preparation of a variety of products that find their way into commercial and residential uses.

One of the drawbacks of using formaldehyde-based compositions in such applications, however, is the potential for formaldehyde emissions from the finished article. It is known that gaseous formaldehyde is released from such articles, some of which is attributable to unreacted formaldehyde in the cured resin binder and some of which may be attributable to degradation or decomposition products generated over time under acidic conditions, elevated temperatures, and/or high humidity from components of the articles.

Thus, there is a continuing need for new methods for reducing formaldehyde emission in products produced using formaldehyde-based or formaldehyde containing compositions.

DETAILED DESCRIPTION OF THE INVENTION

The present invention is directed to methods for reducing the amount of formaldehyde emitted into the surrounding environment by products made with, or otherwise containing a formaldehyde-emitting composition, especially while the product is being transported or stored.

The present invention is specifically directed to reducing the amount of formaldehyde emitted into the surrounding environment by products selected from the group consisting of cellulose laminates, permanent press (wrinkle-free) textiles, floral foams and ceiling tiles.

The invention also is directed to a packaged product and particularly a package of cellulose laminates, permanent press (wrinkle-free) textiles, floral foams, or ceiling tiles, comprising a formaldehyde-based or a formaldehyde-containing composition, such as a formaldehyde-containing resin, that has a reduced tendency to emit formaldehyde.

According to the present invention, a formaldehyde scavenger is added separately to a packaged product that comprises a formaldehyde-based or a formaldehyde-containing composition and thus has a tendency to emit formaldehyde. The product, such as cellulosic laminates (both B-staged laminates and fully cured laminates), wrinkle-free fabrics, floral foams, or ceiling or acoustical tiles, is packaged in a way to isolate the formaldehyde emitting product from the general environment, such as by enclosing it in a plastic wrap or a plastic bag to hermetically seal it in an isolated space from the ambient environment. The formaldehyde scavenger is introduced into the so-isolated space containing the product in a number of ways, such as by being carried by, impregnated on, or impregnated in a substrate that is positioned in the space or by injecting a gaseous scavenger into the space.

As used herein, the phrase "formaldehyde-containing composition" or "formaldehyde-based composition" means a composition that has been produced by using formaldehyde as one component or ingredient, or a composition that even though not made using formaldehyde, nonetheless emits formaldehyde as a degradation product under certain conditions of storage or possibly use. Included in such formaldehyde-containing compositions or formaldehyde-based compositions are formaldehyde-containing resins often used as binders, adhesives and strengthening agents made from a molar excess of formaldehyde and one or more formaldehyde-reactive monomers such as phenol, urea, acetone, melamine and the like. Such "formaldehyde resins" typically contain free, i.e., unreacted formaldehyde, and exhibit formaldehyde emissions both during their cure and in the absence of an effective treatment, following their cure. Such resins are well known to those skilled in the art and do not require a detailed description. Such resins are commercially available from resin suppliers such as Georgia-Pacific Chemicals LLC, Atlanta, Ga. The specific nature of any particular formaldehyde-containing composition and such formaldehyde-containing resins do not form a part of the present invention.

One formaldehyde-containing resin, commonly used in connection with the manufacture of a wide variety of products including cellulosic laminates and floral foams, is made by reacting a molar excess of formaldehyde with phenol in the presence of an alkaline catalyst such as sodium hydroxide.

Another common formaldehyde-containing resin, commonly used in connection with the manufacture of a wide variety of products including ceiling or acoustical tiles and cellulosic laminates, is made by reacting a molar excess of formaldehyde with melamine often in the presence of an alkaline catalyst such as sodium hydroxide.

Still another common formaldehyde-containing resin, commonly used in connection with the manufacture of a wide variety of products including ceiling or acoustical tiles, is made by reacting a molar excess of formaldehyde with urea often in the presence of an alkaline catalyst such as sodium hydroxide.

As used herein, "curing," "cured" and similar terms are intended to embrace the structural and/or morphological change which occurs to an aqueous binder such as a formaldehyde-containing resin, such as, for example, by covalent chemical reaction (crosslinking), ionic interaction or clustering, improved adhesion to the substrate, phase transformation or inversion, and hydrogen bonding when the resin is dried and heated to an infusible condition.

The terms "carried by," "applied," "coated" and "impregnated" are used throughout the application to characterize the physical relationship between a formaldehyde scavenger composition and a substrate onto which the formaldehyde scavenger composition is applied and retained. The phase "carried by" is a general term that is used to embrace all ways that a formaldehyde scavenger is associated with a substrate. The terms "coating" and "coated" are more apt terms to describe the form of the formaldehyde scavenger composition when applied on to an impervious film, sheet or substrate. The terms "impregnating" and "impregnate" are more apt terms to describe the form of the formaldehyde scavenger composition when applied onto a permeable or a porous film, sheet or substrate into which the composition can saturate. Applicants intend such phrases as "applying a formaldehyde scavenger composition to a sheet," "application of a formaldehyde scavenger composition to a sheet," "a sheet carries a formaldehyde scavenger composition" and similar phrases to embrace both of these physical forms.

The term "cured binder" means the cured formaldehyde-containing resin. The phrase "B-staged resin" or "B-staged binder" means a thermosetting resin or binder, such as a PF resin, that has been dried but not fully cured.

By "reduced tendency to emit formaldehyde" and related phrases are meant that a product or article, such as a cellulosic laminate, a permanent press (wrinkle-free) textile, a phenolic floral foam, or a ceiling or acoustical tile made with, or treated with a formaldehyde-containing or a formaldehyde-based composition, exhibits a lower level of formaldehyde emission than the product would have exhibited if made, or treated with the same formaldehyde-containing or formaldehyde-based composition but in the absence of the formaldehyde scavenging technique, such as a method of the present invention.

As used herein, "aqueous" means water and mixtures composed substantially of water.

In a first aspect, the present invention is directed to a method for reducing the amount of formaldehyde that is emitted into the surrounding environment from a product that was prepared with, or treated with a formaldehyde-containing composition or a formaldehyde-based composition. The invention is especially directed to reducing the amount of formaldehyde that is emitted into the surrounding environment from cellulosic laminates, including both those laminates containing a B-staged resin and those laminates containing a cured resin, from permanent press (wrinkle-free) textiles, from phenolic floral foams and from ceiling or acoustical tiles.

One key feature of the method of the present invention is the insertion of a formaldehyde scavenger into a hermetically sealed package containing the formaldehyde emitting product, where the scavenger is supplied in a form separate from the product. In one particular embodiment, the formaldehyde scavenger is associated with a substrate that is separate from the formaldehyde-emitting product or article. The substrate carries the formaldehyde scavenger, e.g. a formaldehyde scavenger composition is coated on a substrate or is impregnated in a substrate, often applied as an aqueous mixture comprising a formaldehyde scavenger, and the substrate is placed in a mass transfer relationship in a hermetically sealed package with the formaldehyde emitting product or article.

As used throughout the specification and in the claims, the phrase "hermetically seal" and similar phrases do not require an air-tight configuration and are intended to refer to any construction that suitably prevents the undesired escape of any significant fraction of a formaldehyde scavenger from the enclosed space so that that the scavenger can satisfactorily serve its scavenging function.

In yet another aspect, the present invention is directed to a method for reducing the level of formaldehyde emission from a formaldehyde emitting product, especially cellulosic laminates, including both those containing a B-staged resin and those containing a cured resin, permanent press (wrinkle-free) textiles, floral foams and ceiling or acoustical tiles all of which are prepared or treated with a formaldehyde-based composition, which method comprises isolating the product in an enclosed space, and separately introducing a formaldehyde scavenger into the enclosed space, such as by adding into the enclosed space a separate substrate having a formaldehyde scavenger associated with the substrate or by injecting into the enclosed space a gaseous formaldehyde scavenger and thereafter maintaining the scavenger in the enclosed space for a time sufficient to reduce the level of formaldehyde emission. The formaldehyde scavenger and the product can be introduced into the enclosed space in either order.

In still another aspect, the present invention is directed to a method for reducing the level of formaldehyde emission from a formaldehyde emitting product or article, especially cellulosic laminate, including those containing a B-staged resin and those containing a cured resin, permanent press (wrinkle-free) textiles, floral foams and ceiling or acoustical tiles all of which are prepared or treated with a formaldehyde-based composition, which comprises surrounding or encasing the product(s) or article(s) with a film, e.g., by wrapping the product(s) or the article(s) with a film such as a plastic film, and separately providing formaldehyde scavenger, especially a gaseous formaldehyde scavenger, or a separate substrate having a formaldehyde scavenger associated with the substrate, into the so-enclosed space so that the scavenger is in mass transfer contact with formaldehyde emitted from the product(s) or the article(s) for a time sufficient to reduce the level of formaldehyde emission.

In another aspect, the present invention is directed to a method for reducing the level of formaldehyde emission from a formaldehyde emitting product, especially cellulosic laminates including those containing a B-staged resin and those containing a cured resin, permanent press (wrinkle-free) textiles, floral foams and ceiling or acoustical tiles all of which are prepared or treated with a formaldehyde-based composition, which comprises placing the product(s) or the article(s) into a bag, such as a plastic bag, adding a formaldehyde scavenger into the bag, such as by providing a separate substrate having a formaldehyde scavenger associated with the substrate into the bag and then sealing the bag, or such as by injecting a gaseous formaldehyde scavenger into the bag, either before or after sealing the bag, to allow the formaldehyde scavenger to be in mass transfer contact with formaldehyde emitted from the product(s) or article(s) for a time sufficient to reduce the level of formaldehyde emission.

In the case of the floral foam in particular, a small, but sufficient amount of a gaseous formaldehyde scavenger also can be injected directly into the foam itself so that it occupies at least a portion of the space occupied by the open cells of the foam.

These and other aspects of the present invention will be described in the following specification with reference to specific embodiments. This application is not intended to be limited to these specific embodiments; but is intended to cover changes and substitutions that may be made by those skilled in the art without departing from the spirit and the scope of the invention as described further hereinafter.

A first aspect of the invention will now be described with reference to FIG. 1, which schematically illustrates a permanent press textile article, in this case a wrinkle free shirt, stored in plastic packaging for storage (inventory), distribution and sale.

Figure 1:
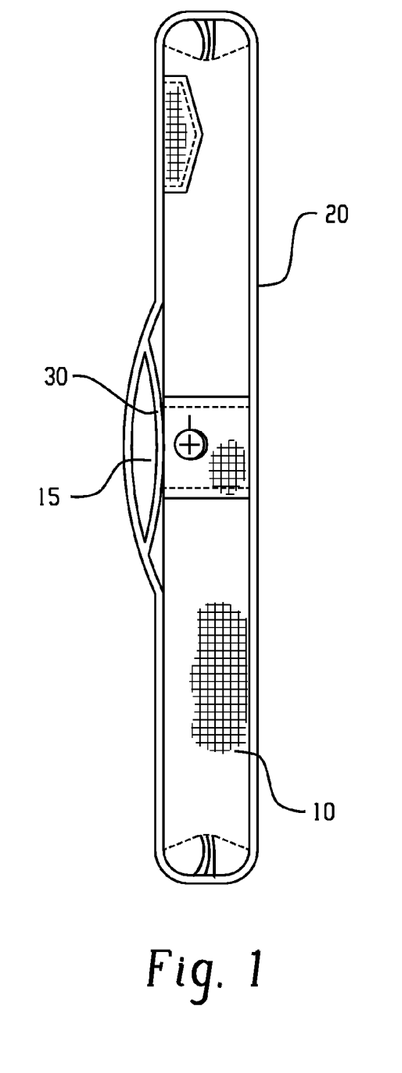
FIG. 1 illustrates an embodiment of the present invention in which a packaged wrinkle-free shirt is stored in a plastic bag along with a paper substrate saturated with a formaldehyde scavenger according to a method of the present invention for purpose of removing formaldehyde emitted from the shirt during distribution and storage.

As illustrated in FIG. 1, a shirt 10 is folded and is enclosed in a film wrap, typically plastic packaging 20. The folded, wrinkle-free shirt is substantially hermetically sealed inside the plastic packaging 20 establishing an interior space 15 into which any formaldehyde emitted from the textile article, e.g., the shirt 10, would, in the absence of the present invention, otherwise accumulate. In accordance with the present invention, also enclosed in the packaging 20 along with the folded shirt 10 is a substrate 30 impregnated with a formaldehyde scavenger. In this embodiment, the substrate 30 may simply be a cellulosic sheet, such as cardboard, blotterpaper or tissue paper, which was previously saturated with an aqueous solution of a formaldehyde scavenger, such as a solution of an alkali metal bisulfite, e.g., sodium metabisulfite, and then dried. The substrate carrying the formaldehyde scavenger acts to capture any formaldehyde that is emitted from the shirt 10 into the interior space 15 during the storage and distribution of the packaged shirt 10 prior to sale.

In accordance with the present invention, the substrate 30 can be any of a wide variety of suitable materials for forming a flat, often flexible, layer, film or foil, including for example paper, cardboard, plastic (such as Mylar, polyethylene or polyvinyl chloride), metal (such as aluminum) and other similar materials. The substrate sheet is generally flexible. The sheet can have a single ply construction, or can have a multi-ply construction. The sheet can be made from a single material or can be made from a mixture of the various substrate materials as, for example, identified above.

The sheet 30 is sized so that a sufficient amount of formaldehyde scavenger is introduced into the package formed by the film 20 for removing any formaldehyde expected to be emitted from the textile article, such as the wrinkle-free shirt 10.

In order to reduce or remove the formaldehyde emitted from the shirt 10 in the package 20, the sheet 30 carries a formaldehyde scavenger composition. When using an impervious sheet material such as a plastic film, the formaldehyde scavenger composition is coated on the surface the sheet material. For porous sheets, such as blotterpaper or tissue paper, the formaldehyde scavenger composition can either be coated on the surface, or can be impregnated though the thickness of the sheet 30. In either case, the formaldehyde scavenger composition is in a mass transfer relationship with the formaldehyde as it is emitted from the shirt 10 into the interior space 15 of package 20.

In an alternate approach to the FIG. 1 embodiment, instead of inserting a substrate 30 into the packaging, a gaseous formaldehyde scavenger could be inserted/injected into the interior space 15 of the substantially hermetically sealed packaging. Apparatus similar to that described hereinafter in connection with the FIG. 4 embodiment could be used to inject a suitable amount of a gaseous formaldehyde scavenger into the interior space 15 of packaging 20.

Cellulosic sheets or sheets or films of other materials coated or impregnated with a formaldehyde scavenger also can be used to remove formaldehyde emitted by cellulosic laminates, floral foams and acoustic ceiling tiles. For example in the case of individual sheets of cellulosic laminates or individual ceiling tiles, or in the case of individual blocks of floral foam, suitably sized sheets carrying a desired amount of a formaldehyde scavenger, similar in configuration to sheet 30 of the FIG. 1 embodiment, can be interposed between separate sheets of the laminates, between individual ceiling tiles, or between individual blocks of foam prior to encasing the laminates, tiles or foam in packaging that essentially hermetically seals the contents of the packages from the ambient environment. The products can be isolated either by wrapping the product(s) in film or by placing the product(s) in a bag. In this way, the paper or film substrate carrying the formaldehyde scavenger acts to capture any formaldehyde that is emitted from the laminates, tiles, or foam into the interior space of the packaging during the storage and distribution of the packaged material prior to use or sale.

Figure 2:
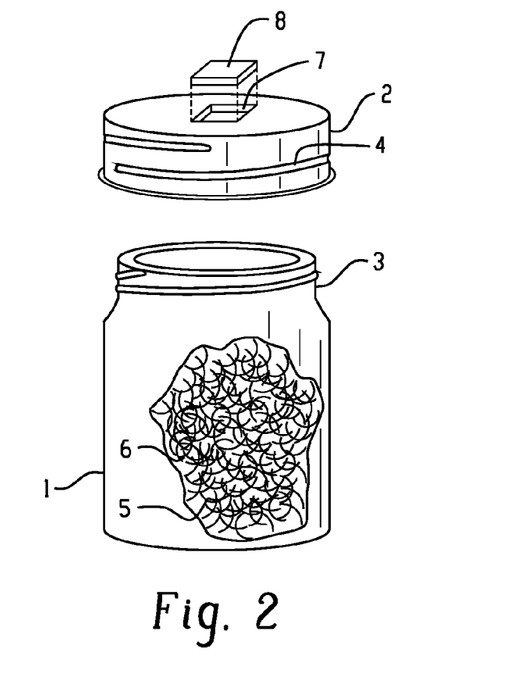
FIG. 2 is a partial breakaway view of one embodiment for introducing a formaldehyde scavenger into a packaged article for removing formaldehyde released during the transport or storage of the article.

FIG. 2 illustrates an alternate embodiment for introducing a formaldehyde scavenger into the interior space of a package containing a formaldehyde emitting product, such as cellulosic laminates, ceiling tiles, floral foams, or permanent press textiles. Referring now to the drawings, FIG. 2 shows an exploded, partial breakaway view of an alternative substrate configuration which carries a formaldehyde scavenger. In this embodiment, the substrate comprises a receptacle or jar 1 which holds a formaldehyde scavenger composition in either a liquid or solid form.

In the specific illustration of FIG. 1, the formaldehyde scavenger is supplied in a solid form, such as powdered sodium metabisulfite 5 and an inert bulk packing material 6 such as glass, wool or cotton for retaining the powdered scavenger in spaced relationship to a gas flow passage means feeding into the receptacle, as described hereinafter. A cap 2 is provided for the receptacle having threading 4 complimentary to threading 3 on the receptacle, so that when the cap and receptacle are fully engaged the threadings 3 and 4 form a reasonably tight seal. Generally, the cap and receptacle are formed of substantially fluid impermeable materials as for example aluminum and glass respectively. A gas flow passage 7 through the cap wall of the container provides communication between the formaldehyde scavenger 5 and the package interior into which the receptacle is inserted. A removable closure means is provided for the gas flow passage 7 in the form of a closure patch 8 which may comprise a suitably sized section of commercially available adhesive tape or a metal foil laminate tape which is applied over the gas flow passage 7 to the top surface of cap 2 to seal the gas flow passage and thereby prevent premature combination of the formaldehyde scavenger with ambient pollutants prior to its insertion into the package containing the formaldehyde-emitting article(s).

When the closure patch 8 is removed from the gas flow passage 7 and the receptacle is inserted into the interior space of the package containing the formaldehyde emitting product(s) or article(s), gas within the space and especially any formaldehyde emitted into the space will flow into the receptacle through the circular passage and the scavenger will capture the formaldehyde, generally by an irreversible (e.g., covalent) reaction, to remove the formaldehyde from the interior space.

Figure 3:
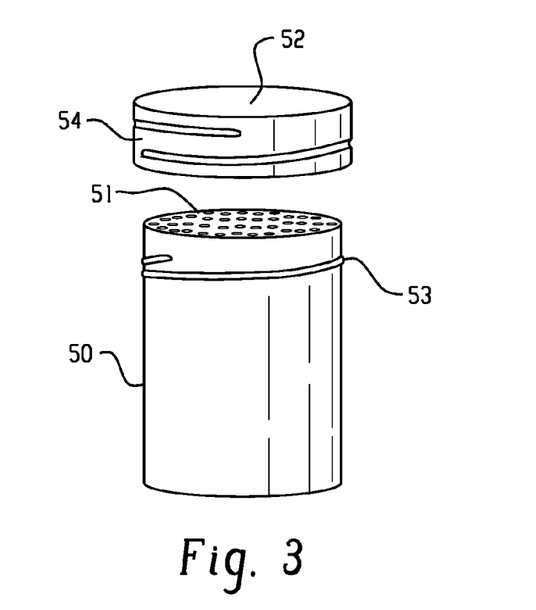
FIG. 3 illustrates another embodiment similar in design to FIG. 2 also for introducing a formaldehyde scavenger into a packaged article for removing formaldehyde released during the transport or storage of the article.

FIG. 3 shows an alternative embodiment of a substrate that may be more appropriate with a liquid formaldehyde scavenger composition than the configuration of FIG. 2. In the FIG. 3 embodiment, a porous disk is employed to provide a plurality of gas flow passages into the receptacle 50. The receptacle 50 holding the formaldehyde scavenger composition (not shown) is provided with an overlying sealing cap 52 by means of the respective complimentary threadings 53 and 54. The receptacle features a porous disk 51 which forms the top surface of the receptacle and provides the gas flow passage means into the receptacle. Just prior to use, the cap 52 is removed from the receptacle 50 and the receptacle is placed in the interior, substantially hermetically sealed space of the package in which the formaldehyde emitting product(s) or article(s) is(are) retained. Gaseous formaldehyde emitted into the interior space of the package will flow into the receptacle through the porous disk 51 and the scavenger will capture the formaldehyde, generally by an irreversible (e.g. covalent) reaction, to remove the formaldehyde from the interior space.

As demonstrated in the following examples, applicants have discovered that by separately placing a formaldehyde scavenger in a mass transfer relationship with the formaldehyde-emitting article and not as a part of the article itself, and especially placing a substrate that carries a formaldehyde scavenging composition, e.g., a sheet or film which is coated with, impregnated with or otherwise contains a formaldehyde scavenging composition, into a substantially hermetically sealed package (Ziplock®-type and Mylar type storage bags were used in the examples) along with the formaldehyde emitting product, one can obtain a significant reduction in the level of formaldehyde emissions from the product.

In carrying out the method of the present invention, formaldehyde emitting products, made with or treated with a formaldehyde-containing composition, and especially cellulose laminates, permanent press (wrinkle-free) textiles, floral foams and ceiling or acoustical tiles, are packaged in a way to isolate the products from the environment. The products can be suitably isolated by encasing them in a sealed plastic film, by placing them in a plastic bag, or by wrapping them with a similar packaging material. Other ways of encasing the product so as to isolate it substantially hermetically from the environment will be apparent to those skilled in the art. The goal is to encase the formaldehyde-emitting product in a substantially airtight package. By "substantially airtight" is meant that the formaldehyde-emitting product is isolated from the environment in a way to restrict access into and egress out from the package. Placed inside the sealed package, along with the formaldehyde emitting product, is a separate formaldehyde scavenger, easily supplied in one embodiment by using a substrate carrying a formaldehyde scavenger composition.

The substrate for use in the invention can take many forms, as for example illustrated above in connection with FIGS. 1-3. According to the broadest aspects of the present invention, the form of the substrate is not to be limited. For example, in addition to using a formaldehyde scavenger in a neat form as for example in FIG. 2, it is also contemplated that the scavenger can be introduced by using a paper saturated with a formaldehyde scavenger composition, by using a vial or porous packet containing a formaldehyde scavenging composition, for example, a solid form of a formaldehyde scavenger composition that is freely available to the isolated atmosphere of the package, and by using many other configurations.

In an alternative embodiment, instead of placing what might be considered a separate substrate carrying the formaldehyde scavenger composition inside the package, the inner surface of the packaging material itself, i.e., the surface of the package exposed to the interior space of the package, would itself carry, e.g., would be coated or impregnated with a formaldehyde scavenger composition. Thus, in this embodiment, the inner surface of the packaging itself comprises a substrate carrying a formaldehyde scavenger and may be provided as a plastic film coated with a formaldehyde scavenging composition, or a metal foil coated with a formaldehyde scavenging composition. Still other ways of introducing the formaldehyde scavenger inside the packaging will be apparent to those skilled in the art and in its broadest aspects, the present invention is not to be limited to any specific technique.

Through such configurations, the formaldehyde scavenger composition is placed in a mass transfer relationship with the formaldehyde emitted from the product(s) or article(s) and these two components are isolated in a substantially airtight manner from the ambient environment. Again, suitable airtight configurations are intended to refer to any construction that suitably prevents the undesired escape of any significant fraction of the formaldehyde scavenger from the enclosed space so that that the scavenger can satisfactorily serve its scavenging function. It is not intended to be limited just to constructions where absolutely no interchange of gas from the enclosed space with the ambient atmosphere is possible. Once in this mass transfer relationship and isolated from the external environment, there is sufficient contact between the scavenger and the formaldehyde emitted by the product(s) or article(s) to reduce the amount of formaldehyde released into the environment from the product.

In accordance with one preferred approach of this embodiment of the present invention for treating a formaldehyde emitting product, especially cellulosic laminate(s), acoustic/ceiling tile(s), floral foam(s), or wrinkle-free textile(s), to reduce the tendency of the product to emit formaldehyde, the formaldehyde scavenger and especially a gaseous formaldehyde scavenger is introduced into an enclosed space with the product(s) or article(s). The products can be treated individually or in bulk. Applicant has found that with this technique one surprisingly obtains a very efficient reduction in the tendency of the product(s) to emit formaldehyde. Indeed, applicant has found that use of a gaseous formaldehyde scavenger in particular is so efficient in reducing the level of formaldehyde emissions from the product(s) that only a small amount of the scavenger is needed to reduce the emissions to an acceptable level. Indeed, in testing done by applicants the formaldehyde emissions of an insulation product have been reduced to below the level of the detection method used to assess the formaldehyde emissions.

This embodiment of the present invention is not to be limited to any particular technique for isolating or encasing the formaldehyde emitting product(s) or article(s) in an enclosed space. While a rigid container, such as a tank or a box could be used, it is more convenient and less expensive to use a flexible container such as a bag. Alternatively, the product(s) or article(s) could be wrapped with a sheet or film of material to create the containing space about the product(s). Functionally, all that is required for this embodiment of the invention is to create a container volume or space in which the product(s) or article(s) is(are) isolated, encased or inserted and suitably sealed such that a gaseous scavenger that is added or otherwise present in the space with the product is retained with little and preferably no loss of scavenger by leakage from the container volume or space. Thus, a formaldehyde emitting product, such as cellulosic laminate(s), acoustic/ceiling tile(s), floral foam(s) or wrinkle-free textile(s), can be suitably isolated by encasing the product(s) in a sealed plastic film, by placing it in a plastic bag, by wrapping it with a similar packaging material) or by another similar technique. In this way, the mass transfer process that takes place as formaldehyde is emitted and captured by the scavenger also present in the bag (preferably a commingled gaseous scavenger) is optimized and/or accelerated.

In the preferred embodiment in which as gaseous scavenger is used, the container volume or space for isolating or encasing the fibrous product can be constructed from any of a wide range of materials suitable for retaining the gaseous scavenger in the volume or space with little and preferably no loss of gaseous scavenger by leakage from the container volume or space during the time the scavenger reacts with free formaldehyde. Materials which can be suitably sealed and which themselves are inherently impervious to gaseous scavengers can be used. While normal construction materials such as a sheet metal, wood panels or gypsum board could be used, it is generally more convenient to use a film of paper, plastic or foil or some combination thereof in multi-ply configurations such as a metal foil-paper laminate. Plastic film wrapping, such as a polypropylene film, a polyethylene film, a polyvinyl chloride film, or a polyester film (e.g., Mylar), in sheet or bag form should generally be suitable. Indeed, one of the benefits of the present invention is that the typical way of packaging such products for commercial storage and distribution using plastic packaging in sheet or bag form is easily adapted to the method of the present invention.

One preferred embodiment of the invention will now be described with reference to FIG. 4, which schematically illustrates one method for introducing a gaseous formaldehyde scavenger into an isolated space for reducing the level of formaldehyde emission from a formaldehyde emitting product, such as bulk wrinkle-free textiles, in the space. Again, while the invention is illustrated in connection with this specific embodiment, those skilled in the art will appreciate that the invention can be adapted for use in reducing the tendency of a wide variety of products made with or treated with a formaldehyde-containing composition to emit formaldehyde, including cellulosic laminates, acoustic/ceiling tiles and floral foams. Also, the invention can be practiced using a variety of other techniques for placing the formaldehyde scavenger and the gaseous scavenger into an enclosed space.

Figure 4:
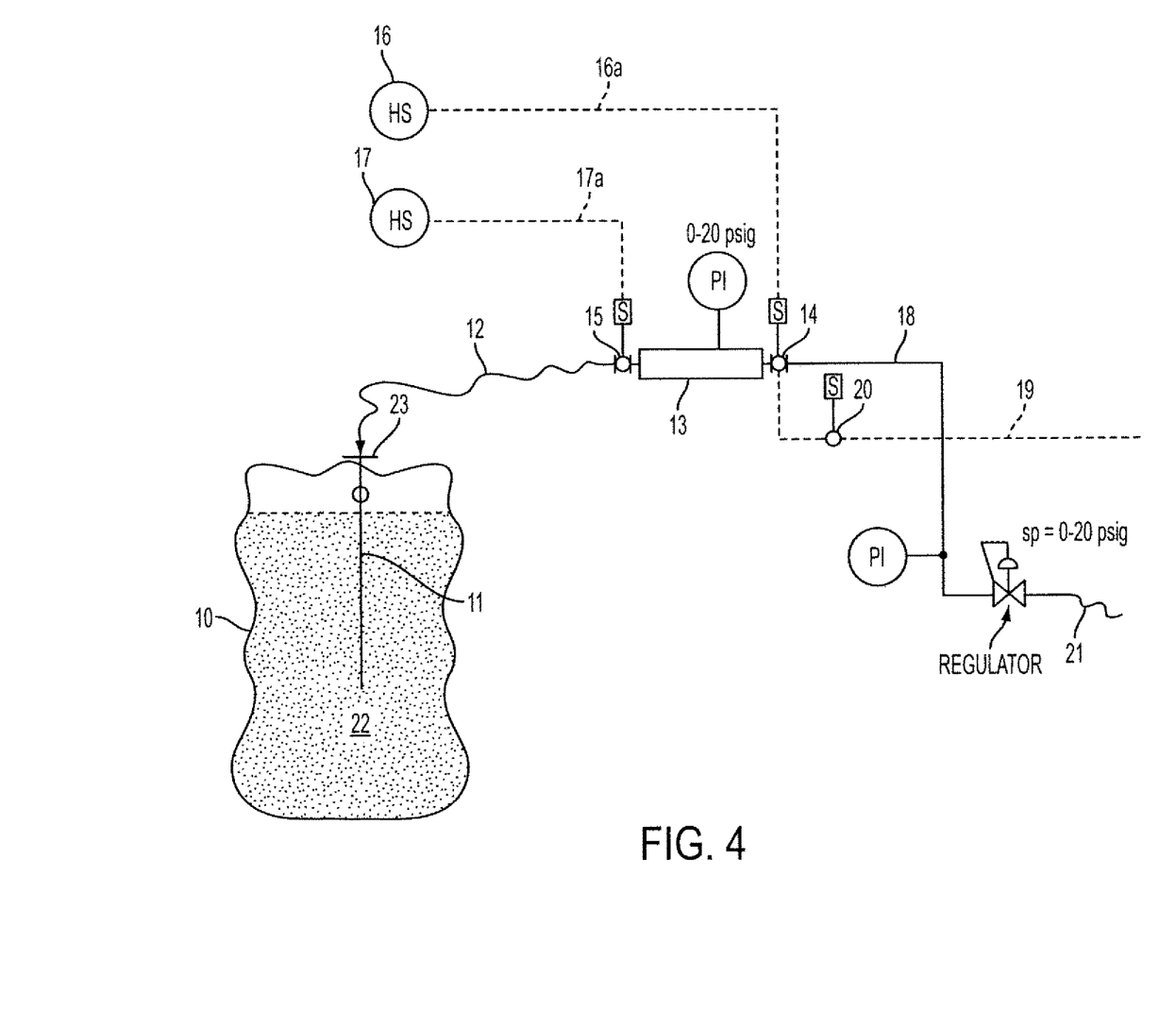
FIG. 4 schematically illustrates another embodiment of the method of the present invention for treating formaldehyde-emitting articles, such as a wrinkle free textile product, in bulk to reduce the tendency of the articles to emit formaldehyde.

Illustrated schematically in FIG. 4 is one representative apparatus designed to implement this embodiment of the present invention. As shown in FIG. 4, an enclosed space or container volume constituting bag 10 is filled with wrinkle-free textile articles 22. The bag 10 has inserted into it an injection lance 11 for delivering the gaseous scavenger. Bag 10 may be made from one of a variety of plastic films such as polypropylene, polyethylene, polyvinyl chloride, polyester and the like. Lance 11 may have an opening at its end and may be provided with a tapered end to facilitate its entry into the enclosed space. Alternatively, lance 10 may have a series of openings (not shown) along its length to distribute the scavenger gas more uniformly throughout the contents of the bag. In yet another embodiment, several lances may be used, instead of a single lance as shown in the schematic drawing, in order to obtain a better distribution of the scavenger gas in and throughout bag 10. These and other such variations are within the skill of the ordinarily skilled worker.

A seal plate and gasket combination 23 ensures that the connection between the lance 11 and bag 10 is sealed, or is air-tight. Testing has shown that such sealing may not be necessary. Other ways of establishing a seal between the gas injector (e.g., lance 11) and the enclosed space or bag 10 will be apparent to those skilled in the art.

The injection lance 11 is connected by a gas hose 12 to a gas charge container 13. The gas charge container may simply be a suitably sized cylinder. Other arrangements for supplying a set, fixed amount of a gaseous scavenger into the enclosed space will be evident to a skilled worker. Flow of gas into and out of the gas charge container 13 is regulated in part by solenoid valves 14 and 15, whose operation is controlled by controllers 16 and 17 via control lines 16a and 17a, respectively. For safety, the operation of these valves should be interlocked so that sulfur dioxide is not inadvertently discharged through the system when the gas charge container is being filled. On the inlet side of the gas charge container 13 is gas supply tubing 18, which is connected to a gas supply source 21, such as a gas cylinder (not shown) containing the gaseous formaldehyde scavenger, such as sulfur dioxide or ammonia. Gas flow into the bag could also be accomplished using a cylinder with a plunger. The gas also could be delivered by having a plunger assembly push the gas into the bag. This and other injection methods will be evident to skilled workers.

As will be described below, the formaldehyde scavenger may be supplied as a mixture of the active scavenger gas and an inert carrier or dilution gas. An alternative gas supply line 19 is shown in shadow in FIG. 4. The gas supply line 19 is controlled by a solenoid valve 20 and a solenoid controller not shown, for supplying a source of carrier or dilution gas in the event that the gas supply of scavenger from source 21 through gas supply tubing 18 is not supplied premixed with a carrier or dilution gas.

The system operation is very straightforward. Gaseous scavenger, preferably gaseous sulfur dioxide (or a premix of gaseous sulfur dioxide and a carrier gas such as nitrogen) is supplied from a gas supply source 21, such as a pressurized gas cylinder, to the gas charge container 13 by opening the inlet solenoid valve 14 on the pressurized side of the container 13. The flow of gas into the container 13 is stopped by a preset pressure controller 16 at the pressure providing the desired quantity of the charge. At this point, the inlet valve 14 is closed. The contained gas can thereafter be charged, or injected, into the enclosed space, such as bag 10, containing the product to be treated with the scavenger. This is accomplished by placing the injection lance 11 into the receptacle 10 and opening the outlet container valve 15. The lance can be inserted into an opening of the bag before it is sealed for subsequent, storage, distribution and sale. It also is possible to insert the lance 11 after the bag has been readied for storage, distribution and sale simply by piercing or puncturing the wall of the previously sealed bag with lance 11. In any event, discharging the gaseous scavenger through the lance 11 allows the gas to expand into the receptacle 10 through supply tubing 12 and the lance 11. The outlet valve 15 is then closed, and the cycle repeated for subsequent injections of gaseous scavenger into additional bags of wrinkle free textile articles.

As the injection lance is removed from a bag 10 (if provisions for securing the lance are not otherwise provided), some residual sulfur dioxide gas may escape from the lance 11 and tube 12 into the surrounding environment. If this is undesired, this result could be prevented by providing a separate fugitive gas collection system (not shown) for the lance as it is removed from the treated bag 10. Alternatively, the apparatus also could adapted to perform a separate cycle step in which an interim charge of an inert carrier gas (e.g., a short blast of compressed air or nitrogen) is provided after the charge of gaseous scavenger, in order to purge residual scavenger, e.g., sulfur dioxide, from the supply tube 12 and the lance 11 into the receiving receptacle 10. For example, this could be accomplished using supply line 19 and solenoid 20 in combination with solenoid 15, as will be recognized by a skilled worker.

In the case of the floral foam in particular, a small, but sufficient amount of a gaseous formaldehyde scavenger also can be injected through the lance 11 directly into the foam itself so that it occupies at least a portion of the space occupied by the open cells of the foam.

Applicant has observed that implementing this embodiment of the present invention in the context of treating an insulation product, as little as 0.12 g sulfur dioxide per Kg of insulation has reduced the equilibrium level of formaldehyde emission from a blowing wool fiberglass product (as measured using the Dynamic Micro Chamber procedure) from 338 ppb to a non-detectable level. While one has a wide latitude in establishing an upper limit on the amount of the gaseous scavenger to use in the broad practice of this embodiment of the present invention, based on considerations of safety and cost, applicant contemplates using anywhere from 0.03 g to 10.0 g of a gaseous formaldehyde scavenger, and preferably gaseous sulfur dioxide, per Kg of formaldehyde emitting product. More preferably, applicant contemplates using from 0.06 g to 5.0 g of a gaseous formaldehyde scavenger, and preferably sulfur dioxide, per Kg of formaldehyde emitting product. Usually, applicant expects to use from 0.08 g to 0.5 g of a gaseous formaldehyde scavenger, and preferably sulfur dioxide, per Kg of formaldehyde emitting product. As noted above, it is convenient to introduce the formaldehyde scavenger into the enclosed space holding the product using a carrier or dilution gas. This technique provides several advantages. It facilitates delivery of a desired amount of the scavenger gas into the enclosed space and accordingly minimizes waste of the scavenger gas. It also reduces the potential safety hazard associated with any unintentional exhaust of the scavenger gas from the enclosed space.

As noted earlier, the present invention prefers the use of sulfur dioxide as the gaseous formaldehyde scavenger. Based on testing conducted in connection with the scavenging of formaldehyde from fiberglass insulation using the method of the present invention, applicants have observed that sulfur dioxide is more effective than ammonia for reducing the level of formaldehyde emissions from a fiberglass insulation product. In addition, the reaction product that is formed by reaction between sulfur dioxide and formaldehyde is more stable and less odiferous than the corresponding ammonia-formaldehyde product. Indeed, given applicants' discovery of the effectiveness of sulfur dioxide in reducing formaldehyde emission from packaged insulation products and based on testing conducted in connection with the scavenging of formaldehyde from a packaged commercially available fiberglass insulation product, applicants have shown that sulfur dioxide injection for scavenging formaldehyde emissions can be integrated easily as part of the commercial packaging (bagging) operation for distributing cellulosic laminate(s), acoustic/ceiling tile(s), floral foam(s) or wrinkle-free textile(s). As a result, the present invention provides an essentially transparent solution to reducing formaldehyde emission from such products.

Materials to be used in constructing the injection system schematically illustrated in FIG. 4, suitable for handling the desired scavenger gas, be it the preferred sulfur dioxide or ammonia, will be apparent to a skilled worker and need not be identified in the present application. Suffice it to say that the corrosive nature of such gases may necessitate a proper selection of materials of construction to ensure extended trouble-free operation. Such features are within the skill of the ordinarily skilled worker.

Suitable formaldehyde scavengers for use in the broad practice of the present invention, such as for preparing the formaldehyde scavenger composition used to coat or impregnate a substrate such as a paper sheet, for example, by using an aqueous mixture of the formaldehyde scavenger, include singly or in combination such materials as urea ($(H_2N)_2C=O$), low ratio melamine resins, i.e., melamine-formaldehyde resins made with a molar excess of melamine, sodium bisulfite, sodium metabisulfite, other alkali metal and alkaline earth metal bisulfites, sodium sulfite and other alkali metal and alkaline earth metal sulfites, ammonium bisulfite, ammonium sulfite, resorcinol, polyacrylamide, acrylamide, methacrylamide, melamine, biuret ($HN[(H_2N)C=O]_2$), triuret ($N[(H_2N)C=O]_3$), biurea ($[HN(H_2N)C=O]_2$), polyurea, acid salts of aniline, aromatic amines, aliphatic amines, diethylene triamine, triethylene tetraamine, tetraethylene pentamine, other polyamines and their salts, ammonia, polyamidoamines, amino acids, aromatic amino acids such as glycine, p-amino benzoic acid, ammonium bicarbonate, ammonium carbonate, polyethyleneamines, sodium sulfamate, ammonium sulfamate, methane sulfonamide, succinimide, dicyandiamide ($NCNH(H_2N)C=NH$), sulfur compounds with valence state other than +6 including sulfur dioxide, proteins (for example animal proteins such as albumin and plant proteins such as soy protein), an aminopolysaccharide, such as chitosan, thiourea ($(H_2N)_2C=S$), guanadine($(H_2N)_2C=NH$), sodium and other alkali metal salts of taurine, sulfanilic acid, disodium salt of glutamic acid, zeolites, permanganates and similar materials. Still other materials that are suitably reactive with formaldehyde such that they can satisfactorily remove gaseous formaldehyde from an enclosed space can be used and are intended to be embraced by the phrase "formaldehyde scavenger."

Depending on the particular embodiment, certain scavengers will likely exhibit more effective treatment. Optimal selection of a particular scavenger can generally be accomplished using routine experimentation. Particularly preferred formaldehyde scavengers are tetraethylene pentamine, sulfur dioxide and sodium bisulfite (and the related material sodium metabisulfite).

An aqueous mixture of a formaldehyde scavenger (or formaldehyde scavengers) is prepared simply by mixing the scavenger (or scavengers) with water. The concentration of formaldehyde scavenger in the aqueous mixture can vary within wide limits (and is usually influenced by the aqueous solubility or miscibility of the scavenger), provided the amount does not interfere with the technique chosen for applying the aqueous mixture to a substrate, such as a paper sheet material. Application of a formaldehyde scavenger composition onto or into a substrate is generally accomplished by one of a variety of conventional coating techniques such as, for example, air or airless spraying, padding, saturating, roll coating, curtain coating and other similar techniques. The present invention is not to be limited to the specific way in which the formaldehyde scavenger is applied onto or into a substrate.

Usually, when using an aqueous mixture to impregnate or coat a substrate material, the aqueous mixture contains from as little as 0.01% by weight to as much 99% by weight or more of the formaldehyde scavenger, depending in many cases on the aqueous solubility or miscibility of the particular scavenger. Obviously, if the scavenger is used in a neat form, such as may be the case when using tetraethylene pentamine, which itself is a liquid at ambient conditions, the formaldehyde scavenger composition may be 100% scavenger. Thus, the present invention is not limited to any specific level of scavenger whether supplied as an aqueous scavenger mixture, or not.

The specific technique used to apply a formaldehyde scavenger composition to a substrate, such as a paper sheet, cardboard, fabric, glass mat, plastic, metal or a similar foil or film material, can be similar to those techniques that are commonly employed in papermaking operations to apply a sizing composition to the surface of a paper product. Depending on the particular scavenger being used, either a neat scavenger in a liquid form, or more usually an aqueous formaldehyde scavenger composition, may be applied to a surface of the substrate, such as a paper sheet using a size press, by maintaining a puddle of the formaldehyde scavenger composition though nip rolls, or by flooding a surface of the sheet material with the assistance of a doctor knife blade. For example, a web of sheet material can be conducted through the nip of a roller-coater apparatus (various configurations are available), where the scavenger is applied. Alternatively, the formaldehyde scavenger composition may be sprayed onto the web of the sheet or can be applied by dipping the sheet into an aqueous composition of the formaldehyde scavenger, or by using one of the wide variety of conventional coating techniques known to those skilled in the art. Sheet material that is treated with a scavenger, such as an aqueous mixture of a scavenger, is then dried as needed at an elevated temperature to produce a sheet carrying the scavenger composition.

The nature of the substrate, such as a paper sheet, influences whether the substrate, or sheet material is coated or impregnated with the formaldehyde scavenger composition. Non-porous or impermeable substrates will receive only a surface coating of the formaldehyde scavenger composition. In contrast, porous substrates will tend to be impregnated at least partially through the thickness of the sheet depending upon the porosity of the substrate and the rheological property of the formaldehyde scavenger composition. For example if a paper or cardboard material is used as the substrate, the formaldehyde scavenger composition might also be added at the wet end of the paper-making process itself. In this way the total thickness of the substrate or sheet material can be impregnated with the formaldehyde scavenger composition.

Application of the formaldehyde scavenger to the substrate can be accomplished either as a post-production operation or as a portion of the sheet production process itself. The present invention is not limited to the way in which the formaldehyde scavenger composition is applied onto, or impregnated into, the substrate material.

The formaldehyde scavenging composition is applied onto or impregnated into the substrate material in an amount such as to provide an effective amount of the formaldehyde scavenger composition for trapping or removing formaldehyde emitted from the packaged product. Preferably, the formaldehyde scavenger composition is applied in an amount of about 0.1 wt. % to about 200 wt. % (on a dry basis) based on the weight of the substrate material. Usually, the level is about 1 wt. % to about 70 wt. %, and most often from about 2 wt. % to about 50 wt. %.

A key advantage of the present invention is that because the application of the formaldehyde scavenger is independent of and not commingled with the formaldehyde-containing composition, such as being a component of the formaldehyde-based resin binder itself the level of addition of the scavenger does not adversely impact tensile properties or other properties of the cured binder.

Even though the formaldehyde scavenger is not intimately associated with the formaldehyde-containing composition of the product, applicants have observed that placing the scavenger in a mass transfer relationship with the product, on or in a substrate such as on or in a paper sheet, provides sufficient mass transfer contact between the scavenger and the formaldehyde emitted by the product to reduce the amount of formaldehyde released into the environment. Indeed, in some experiments they have conducted applicants have observed a reduction in formaldehyde emission to a non-detectable level.

In some cases the formaldehyde scavenger may be a solid that can be melted to produce a molten liquid and the present invention contemplates applying such a molten form of the formaldehyde scavenger to the substrate material. In the case of a molten liquid, the scavenger can be sprayed on or dripped on the substrate. In the case of a solid form of the scavenger, the scavenger also can be applied as small particles that either can be retained within the porosity of a porous substrate material such as paper (such as when a filler is commonly added during the preparation of paper), or can be affixed with the separate application of an adhesive to the surface of the substrate (much like the attachment of abrasive particles to a backing sheet when preparing sand paper). Preferably, a non-formaldehyde-containing adhesive binder is used for affixing such solid particles as a surface coating on the substrate or a sheet material.

Particles that pass through a 3 Mesh screen (Tyler Screen designation) but are retained by a 100 mesh screen generally should be suitable for such uses. Other suitable particle sizes to use, depending on the specific embodiment contemplated, will be apparent to those skilled in the art. The particles can be mixed with a binder formulation or can be sprinkled onto a substrate material coated with the wet binder formulation. Alternatively, the scavenger could be loaded onto an inert carrier material, such as by coating or absorbing the scavenger, for example using an aqueous solution, onto sepiolite, activated carbon, activated carbon fibers, zeolite, activated alumina, vermiculite, diatomaceous earth, perlite particles or cellulose fibers, with the scavenger-loaded inert material then being applied to or carried by a substrate.

To accelerate the scavenging action of the substrate it is preferable to place the product into a substantially hermetically sealed package (as shown below, Ziplock®-type storage bags are used in the examples) with the substrate. In particular, the formaldehyde emitting product along with a scavenger coated or impregnated substrate, preferably is packaged in a way to isolate the product from the environment. The product can be suitably isolated by encasing it in a sealed plastic film, by placing it in a plastic bag, by wrapping it with a similar packaging material, or by another similar technique. In this way, the mass transfer process that takes place as formaldehyde is emitted and captured by the scavenger is optimized and/or accelerated.

The formaldehyde scavenger composition used in connection with the present invention may, in addition to the formaldehyde scavenger itself, contain one or more additives to provide desired characteristics to the composition. Suitable additives include, but are not limited to, dyes and pigments, humectants or moisturizers, preservatives, antimicrobial agents, corrosion inhibitors, surfactants or wetting agents, pH buffers, viscosity control agents, mutual solvents and combinations thereof. Use of any particular additive, or any specific combination of additives, will depend on the actual formaldehyde scavenger selected and the particular way in which the composition is to be employed. Considerations influencing the preparation of a suitable formaldehyde scavenger composition are well within the skill of the art.

For example, there is some indication that in some embodiments the performance of the formaldehyde scavenger applied in accordance with the present invention may be improved by the presence of a moisturizer or humectant. The moisturizer or humectant could simply be the humidity available in the ambient environment, or may be a polyol, or any other liquid, preferably a low volatility liquid, added a part of a formaldehyde scavenger composition. For example, the moisturizer could simply be water added as part of an aqueous solution of a formaldehyde scavenger, a polyol, such as glycerine, propylene glycol, trimethylol propane, or diethylene glycol, a polymine, an amine salt, calcium chloride and other deliquescent materials, polyacrylamides and other super absorbent materials, starch or other liquid, such as low volatility liquids, may be applied as part of the formaldehyde scavenger composition to a substrate. In cases where the scavenger is applied as an aqueous solution and dried, applicants suspect that residual moisture in the dried scavenger coating, enhanced by the presence of a polyol, or other moisturizer, may assist the formaldehyde-reducing performance of the scavenger.

Products treated to reduce formaldehyde emission in accordance with the present invention may be used in the same way and for the same applications conventionally used in the past.

Embodiments of the present invention where a separate substrate laden with a formaldehyde scavenger is introduced into a sealed enclosure with the formaldehyde-emitting product are illustrated in the following examples.

As noted above, in one embodiment of the present invention a gaseous formaldehyde scavenger is advantageously employed. Selection of a particular gaseous scavenger, be it sulfur dioxide or ammonia, for any particular application can generally be accomplished using routine experimentation. When using sulfur dioxide, the reaction with free formaldehyde is similar to that observed when reacting formaldehyde with a metabisulfite salt, which leads to the formation of the corresponding salt of hydroxysulfonic acid (please see Formaldehyde, Walker, J. Frederic, $3^{rd}$ Ed. pp. 251-253).

While not wishing to be bound by any particular theory, it is believed that the present invention maximizes the effectiveness of the formaldehyde scavenger for complexing or otherwise reacting with freely emitted formaldehyde into the confined volume by independently inserting the scavenger into an enclosed space with the formaldehyde emitting article or product.

It will be understood that while the invention has been described in conjunction with specific embodiments thereof, the foregoing description and following examples are intended to illustrate, but not limit the scope of the invention. Other aspects, advantages and modifications will be apparent to those skilled in the art to which the invention pertains, and these aspects and modifications are within the scope of the invention.

Example 1

Four pieces of B-staged laminate paper, i.e. paper saturated with a phenol-formaldehyde resin and then B-staged, having the dimensions 8 inches by 15 inches (120 inches$^2$) were placed into four Ziplock® bags. Into two of the bags, a sheet of Kraft paper of the same dimension as the laminate having a basis weight of 23 lbs/1000 ft$^2$ and previously saturated with an aqueous sodium bisulfite solution using a size press and then dried to a sodium bisulfite loading of about 34% by weight of the paper was also inserted into two of the bags containing the B-staged laminated paper. All four bags then were sealed. The bagged samples were stored for 72 hours at ambient condition.

The laminate samples stored with and without the formaldehyde scavenger-treated Kraft paper were removed from the bags and individually placed in a dynamic micro chamber (DMC) and formaldehyde emissions from each sample was determined using a consistent steady state technique. Emissions within the chamber were collected using 20 mls of 0.25N (substantially 1%) NaOH in an impinger with the air flow into the impinger set at 1.0 l/min. and with the emissions collected for 30 minutes. Air flow inside the DMC was set at 1.5 liters/min. The impinger solutions were tested for formaldehyde emissions using a standard chromotropic acid method. A DMC is described in Georgia-Pacific Chemicals LLC U.S. Pat. Nos. 5,286,363 and 5,395,494.

The average formaldehyde emission from the untreated (control) samples was above 700 ppb. The emissions from the two samples stored with the bisulfite treated paper were below the limits of detection.

Example 2

A box of commercially available Armstrong SC 226 ceiling tile was purchased from a Lowes hardware store. Four pieces of ceiling tile having the dimensions 8 inches by 20 inches (160 inches$^2$) were cut from the commercial tile and two pieces were placed inside two separate Mylar® bags. Formaldehyde scavenger-treated paper was prepared by spraying blotterpaper dimensioned 12 inches by 12 inches (1 square foot) with 50 grams of a 33% by weight aqueous solution of sodium bisulfite. The saturated paper was then dried for 2.5 minutes in an over having a temperature of 105° C. One piece of the formaldehyde scavenger-saturated paper was placed between two pieces of ceiling tile in one of the bags. Both bags were then sealed, with the bag not containing the treated paper serving as a control sample. The bagged samples were stored for 72 hours at ambient conditions.

The bagged samples stored with and without the formaldehyde scavenger-treated paper were removed from the bags and separately placed in a dynamic micro chamber (DMC) and formaldehyde emissions from each set of samples was determined using a consistent steady state technique. Emissions within the chamber were collected using 20 mls of 0.25N (substantially 1%) NaOH in an impinger with the air flow into the impinger set at 1.01/min. and with the emissions collected for 30 minutes. Air flow inside the DMC was set at 1.5 liters/min. The impinger solutions were tested for formaldehyde emissions using a standard chromotropic acid method. A DMC is described in Georgia-Pacific Chemicals LLC U.S. Pat. Nos. 5,286,363 and 5,395,494.

Figure 5:
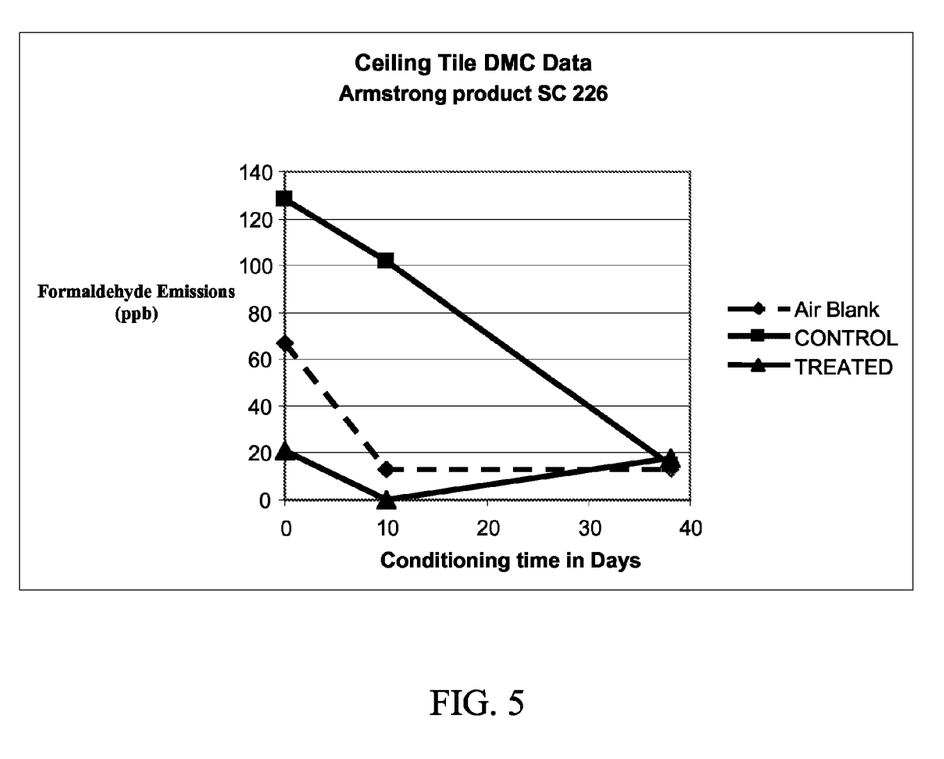
FIG. 5 is a graph showing the comparative formaldehyde emission results upon using one embodiment of the method of the present invention for treating a commercial ceiling tile product to reduce its tendency to emit formaldehyde.

After the initial testing, the ceiling tiles were placed into a conditioning room on racks without any formaldehyde scavenger-saturated treatment paper. After an additional 10 days and after a total of 38 days of storage (conditioning), the respective sample sets were again tested in the DMC using the same procedure described above. An air blank was also analyzed on each occasion to determine background levels of formaldehyde in the room in which the DMC test was conducted. The results are presented in FIG. 5.

Example 3

Two maroon Van Heusen dress shirts were purchased from Macy's, removed from their packaging and each placed inside a Ziploc® bag. One was placed inside the bag along with bisulfite (formaldehyde scavenger) treated paper, while the other shirt was placed inside the bag without such paper to serve as a control. The formaldehyde scavenger-treated paper was prepared by spraying fifty-four grams of a 33% by weight sodium bisulfite solution onto blotterpaper and drying in an oven for four minutes. The oven had been heated to 105° C. Both bagged shirts were stored for thirteen days and then were removed from their respective bags and separately tested in the DMC chamber.

The formaldehyde emissions of the respective samples were measured in the DMC (Dynamic Micro Chamber) using the following equilibrium procedure. Air was circulated inside the chamber for 30 minutes with no air flow entering or exiting the chamber. After 30 minutes, an impinger was connected to the chamber and the impinger was sparged with air from inside the chamber for 30 minutes at a rate of 1.0 liter per minute. Air exiting the impinger was returned to the DMC. Any formaldehyde emitted from the samples was collected using 20 mls of 0.25N NaOH in the impinger. Impinger solutions were tested for formaldehyde emissions using the standard chromotropic acid method.

The formaldehyde emission from the untreated (control) samples was 439 ppb, while the formaldehyde emission from the treated sample stored with the bisulfite treated paper was 71 ppb.

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5%.

We claim:

1. A process of removing formaldehyde emitted from an article selected from the group consisting of permanent press textiles, floral foams, ceiling tiles, and acoustical tiles, the article made with or treated with a formaldehyde-containing composition, the process comprising isolating the article in an enclosed space by encasing the article in a substantially air-tight package either (a) by wrapping the article with a film of material, or (b) by placing the article into a bag and then sealing the bag, along with a separate formaldehyde-scavenger, such that the formaldehyde-scavenger is in mass transfer relationship with the article.

2. The process of claim 1 wherein the formaldehyde scavenger is provided as a formaldehyde scavenger composition carried by a substrate.

3. The process of claim 2 wherein the formaldehyde scavenger composition comprises a formaldehyde scavenger selected from the group consisting of tetraethylene pentamine, sodium bisulfite, and sodium metabisulfite.

4. The process of claim 2 wherein the substrate carrying the formaldehyde scavenger composition is selected from the group consisting of a paper saturated with a formaldehyde scavenger composition, a receptacle containing a formaldehyde scavenging composition, a porous packet containing a formaldehyde scavenging composition, a plastic film coated with a formaldehyde scavenging composition and a metal foil coated with a formaldehyde scavenging composition.

5. The process of claim 4 wherein the formaldehyde scavenger composition is applied to a paper sheet as a liquid.

6. The process of claim 5 wherein the liquid is an aqueous mixture of a formaldehyde-scavenger.

7. The process of claim 1 wherein the formaldehyde scavenger is supplied in a neat form.

8. The process of claim 7 wherein the formaldehyde scavenger comprises solid particles of a formaldehyde scavenger.

9. The process of claim 8 wherein the formaldehyde scavenger is loaded onto solid particles of an inert carrier.

10. The process of claim 1 wherein the formaldehyde scavenger is selected from the group consisting of urea, low mole ratio melamine resins, sodium bisulfite, sodium metabisulfite, sodium sulfite, sodium sulfamate, ammonium sulfamate, an acid aniline salt, ammonium bisulfite, ammonium sulfite, methane sulfonamide, succinimide, resorcinol, polyacrylamide, acrylamide, methacrylamide, melamine, diethylene triamine and its salts, triethylene tetraamine and its salts, tetraethylene pentamine and its salts, biuret, triuret, biurea, polyurea, aromatic amines, aliphatic amines, ammonia, polyamidoamines, ammonium bicarbonate, ammonium carbonate, polyethyleneamines, polyamines, dicyandiamide, a sodium salt of taurine, sulfanilic acid, sulfur compounds with valence state other than +6, ammonium sulfite, disodium salt of glutamic acid, an amino acid, a protein, an aromatic amino acid, an aminopolysaccharide, p-amino benzoic acid, thiourea, guanadine, zeolites and permanganate.

11. The process of claim 10 wherein the formaldehyde scavenger is selected from the group consisting of tetraethylene pentamine, sodium bisulfite, and sodium metabisulfite.

12. The process of claim 11 wherein the formaldehyde scavenger is sodium bisulfite.

13. The process of claim 2 wherein the formaldehyde scavenger composition comprises between 0.1% by weight and 200% by weight of the substrate.

14. The process of claim 1 further comprising isolating the article in the enclosed space with a paper sheet wherein the paper sheet is impregnated with the formaldehyde scavenger.

15. The process of claim 1 further comprising:
introducing the formaldehyde scavenger in a gas phase into the space; and
maintaining the gaseous formaldehyde scavenger in the space for a time sufficient to reduce the level of formaldehyde emission from the article.

16. The process of claim 15 wherein the gaseous formaldehyde scavenger is selected from the group consisting of ammonia and sulfur dioxide.

17. The process of claim 16 wherein the gaseous formaldehyde scavenger is sulfur dioxide.

18. The process of claim 16 wherein the enclosed space is defined by a bag, and wherein the bag comprises a plastic.

19. The process of claim 17 wherein the enclosed space is defined by a bag, and wherein the bag comprises a plastic.

* * * * *